(12) United States Patent
Axelson et al.

(10) Patent No.: US 9,320,261 B2
(45) Date of Patent: Apr. 26, 2016

(54) DEVICE TO MOTIVATE AN ANIMAL TO LEAVE A MILKING STALL

(75) Inventors: Johan Axelson, Bromma (SE); Mats Gudmundsson, Nykvarn (SE)

(73) Assignee: DELAVAL HOLDING AB, Tumba (SE)

( * ) Notice: Subject to any disclaimer, the term of this patent is extended or adjusted under 35 U.S.C. 154(b) by 189 days.

(21) Appl. No.: 14/130,937

(22) PCT Filed: Jul. 6, 2012

(86) PCT No.: PCT/SE2012/050800
§ 371 (c)(1),
(2), (4) Date: Jan. 6, 2014

(87) PCT Pub. No.: WO2013/009250
PCT Pub. Date: Jan. 17, 2013

(65) Prior Publication Data
US 2014/0158065 A1    Jun. 12, 2014

Related U.S. Application Data

(60) Provisional application No. 61/506,228, filed on Jul. 11, 2011.

(30) Foreign Application Priority Data

Jul. 11, 2011    (SE) ...................................... 1150662

(51) Int. Cl.
*A01K 3/00*    (2006.01)
*A01K 1/12*    (2006.01)
*A01K 15/02*    (2006.01)

(52) U.S. Cl.
CPC . *A01K 1/12* (2013.01); *A01K 1/126* (2013.01); *A01K 15/02* (2013.01)

(58) Field of Classification Search
CPC ....................................................... A01K 3/00
USPC ....................................................... 119/843
See application file for complete search history.

(56) References Cited

U.S. PATENT DOCUMENTS

| 3,460,515 A | * | 8/1969 | Van Der Heide | ........ | A01K 1/12 |
| | | | | | 119/14.03 |
| 5,195,455 A | * | 3/1993 | van der Lely | ............ | A01K 1/01 |
| | | | | | 119/14.03 |

(Continued)

FOREIGN PATENT DOCUMENTS

| DE | 41 34 163 A1 | 4/1993 |
| EA | 200970802 A1 | 12/2009 |

(Continued)

OTHER PUBLICATIONS

International-Type Search Report, dated Jan. 12, 2012, from corresponding PCT application.

(Continued)

*Primary Examiner* — Kristen C Hayes
(74) *Attorney, Agent, or Firm* — Young & Thompson

(57) ABSTRACT

A device to motivate an animal to leave a milking stall includes at least a first unit configured to motivate the animal to leave the milking stall by a first motivation means; a second unit configured to motivate the animal to leave the milking stall by a second motivation means which is of a different type than the first motivation means; and a control unit configured, when it is time for the animal to leave the milking stall, to activate at least one of the first and second units such that the animal in the milking stall will be motivated to leave the milking stall.

20 Claims, 2 Drawing Sheets

(56) References Cited

U.S. PATENT DOCUMENTS

| | | | | |
|---|---|---|---|---|
| 5,469,808 | A | * | 11/1995 | Street .................. A01K 1/12 119/14.03 |
| 7,213,539 | B1 | * | 5/2007 | Mollhagen ........... A01K 1/0029 119/843 |
| 8,074,600 | B2 | | 12/2011 | Kallen et al. |

FOREIGN PATENT DOCUMENTS

| | | |
|---|---|---|
| EP | 0 562 655 A2 | 9/1993 |
| EP | 0 636 313 A2 | 2/1995 |
| EP | 1 195 086 A2 | 4/2002 |
| EP | 1 797 755 A2 | 6/2007 |
| GB | 1 175 588 A | 12/1969 |
| NL | 8601297 A | 12/1987 |
| SU | 1166752 A | 7/1985 |
| SU | 1757545 A1 | 8/1992 |
| WO | 96/19917 A2 | 7/1996 |
| WO | 00/13497 A1 | 3/2000 |
| WO | 2004/068940 A1 | 8/2004 |

OTHER PUBLICATIONS

International Search Report, dated Oct. 11, 2012, from corresponding PCT application.

Supplementary International Search Report, dated Dec. 12, 2013, from corresponding PCT application.

* cited by examiner

DEVICE TO MOTIVATE AN ANIMAL TO LEAVE A MILKING STALL

BACKGROUND OF THE INVENTION AND PRIOR ART

The present invention relates to a device to motivate an animal to leave a milking stall, wherein the device comprises a first unit configured to motivate an animal to leave the milking stall by means of a first motivation means.

Milking stalls for voluntary milking of cows comprises a milking robot attaching teat cups to the teats of cows entering the milking stall. When the milking process of a cow is finished, an exit gate is open and the cow leaves the milking stall. However, all cows do not leave the milking stall immediately when the exit gate is open. In this case, a subsequent cow has to wait some time before the milking stall is vacant. Milking stalls provided with a milking robot are expensive. It is therefore important that the capacity of such a milking stall is used in a substantially optimal manner and without unnecessary time delays between the milking processes.

GB 1,175,588 shows a rotary parlour with a plurality of milking stalls for cows. A constraining means is arranged at an exit opening of the platform. The object of the constraining means is to motivate the cows to leave the platform when the milking stall arrives to the exit opening. The constraining means may be a flashing light, an electric dog or means for directing a water jet towards the head of the animal.

DE 41 34 163 shows a method for blowing an air jet towards animals in order to guide the animals in a desired direction. A cow may be in a calm half sleep state after it has been milked. An air jet towards the cow wakes it up from the half sleep state and draws attention to the fact that it is time to leave the milking stall.

EP 562 655 shows a milking stall for automatic milking of cows. The milking stall includes expelling means for removing a cow from the milking stall. The expelling means consists of a mechanical device including movable plates configured to come in contact with a rear portion of a cow and push the cow towards an exit of the milking stall when it is time to leave. This mechanical device may have a reliable function but it is heavy and complicated to arrange in a milking stall.

SUMMARY OF THE INVENTION

The object of the present invention is to provide a device which is capable to motivate milking animals to leave a milking stall substantially immediately every time a milking process has been finished.

The inventors has discovered that milking animals get used to substantially all kind of motivation means such as air jets etc. After a number of milking processes, the ability of the motivation means to motivate the animals to leave the milking stall decreases.

The above mentioned object is obtained by the initially mentioned device which is characterized in that the device comprises at least a second unit configured to motivate an animal to leave the milking stall by means of a second motivation means which is of different type than the first motivation means and a control unit configured to activate at least one of said units such that an animal in the milking stall will be motivated to leave the milking stall by means of the first motivation means and/or the second motivation means when it is time for the animal to leave the milking stall.

Thus, the animals will sometimes be motivated to leave the milking stall by means of the first motivation means. Other times, the animals will be motivated to leave the milking stall by means of the second motivation means. A further possibility is to use the first motivation means and the second motivation means at the same time. By such a use of the at least two units with different types of motivation means, the risk that the animals get used to the device is low. Consequently, the ability of the device to motivate the animals to leave the milking stall will not significantly decrease with time. In most cases, the different kinds of units may be given a relatively simple design with few including components. The control unit which activates one of the units may be a relatively simple computer or the like provided with a suitable software for this purpose. Thus, the device may be given very reliable function with a relatively simple design.

The motivation means may be divided into two main groups. A first group of motivation means is positioned inside the milking stall. They have the task to wake up the animal in the milking stall and pay the attention to the fact that it is time to leave the milking stall. A second group of motivation means is positioned outside the milking stall. They have the task to attract the animals such that they will be motivated to leave the milking stall. Thus, motivation means from these two different groups are of different types since they motivate an animal to leave by two different reasons. Furthermore, motivation means of different types may be perceived by two different senses of the animal such as sight, hearing, touch, smell and taste. If the motivation means of different types are perceived with the same sense, such as the touch, the touch effect can be provided by medium in different phases such as a gaseous medium, a liquid medium or a solid medium. The touch effect may also be provided by electricity etc. Gas jets, liquid jets, mechanical touching components and electricity are perceived quiet differently when they come in contact with the skin of an animal. However, different kinds of gas jets directed against the skin of the animal do not perform different types of motivation means since they motivates the animal to leave the milking stall by the same reason, they are perceived by the same sense and the touch effect is provided with same kind of medium. In this case, different variants are achieved by the same type of motivation means.

According to a preferred embodiment of the invention, the different types of motivation means are two of the following motivation means gas jets directed to the animal: liquid jets directed to the animal, a sound alarm, a light alarm, a mechanical component acting on the animal, electric impulses, to remove the food in the milking stall, an attractive sound, sight or smell that is perceived to come from a position outside of the milking stall. These different types of motivation means have the ability to wake up the animals after the milking process in the milking stall and pay the attention to the fact that it is time for the animal to leave the milking stall or the ability to attract the animal from a position outside the milking stall such that it will be motivated to leave the milking stall.

According to an embodiment of the invention, the device comprises more than two units wherein each of the units is configured to motivate an animal to leave the milking stall by means of different types of motivation means. By the use of three or more different types of motivation means, the risk that the animals get used to the device is further reduced.

According to an embodiment of the invention, at least one of said units is configured to motivate an animal to leave the milking stall by means of a motivation means having a variable function, preferably varied in time and intensity. Motivation means in the form of, for example, air jets, water jets, sound alarms, light alarms, mechanical pushing devices, an electric impulses are easy to vary in time and intensity. The ability to vary at least one of the different types of motivation means in time and intensity increases further the capacity of the device.

According to an embodiment of the invention, the control unit is configured to activate at least one of the units by means of a random number generator. In this case, the different kinds of units will be activated randomly. Thus, there is no possibility that the animal knows in advance what type of motivation means is to be activated when it has to leave the milking stall. In this case, the risk that the animals get used to the different types of motivation means and do not leave the milking stall in time is low. Alternatively, the control unit is configured to activate the units in a predetermined proper order in the milking stall regardless of which animal entering the milking stall. Since the animals in a herd enter the milking stall substantially randomly, also in this case the different kinds of units will be activated randomly for the individual animals. The control unit may here comprise soft ware alternating the activation of the different kinds of units in accordance to a certain schedule.

According to an embodiment of the invention, the device comprises a memory configured to store data of individual animals milked in the milking stall, wherein the control unit is configured to receive information from an identifying sensor about the identity of an animal in the milking stall and activate at least one of the units by means of stored data in the memory of this individual animal. It is here possible to avoid that the same motivation means is used twice in a row for an individual animal. Furthermore, it is possible to vary the use of the motivation means in a specific order for the individual animals. The risk that the animals get used to the motivation means is minimal.

Preferably, the memory is configured to store data about a parameter related to how effectively the different types of motivation means affects on the individual animals when it is time to leave the milking stall. In this case, the control unit receives a feedback on how well the different types of motivation means work on the individual animals in a herd. In view of this information, it is possible to use certain types of motivation means more frequently for specific animals in a herd in order to reduce the time delays between the milking processes in the milking stall in an optimal manner. Said parameter may be related to the time difference between the earliest time when the animal has the opportunity to leave the milking stall after a milking process and the real time at which the animal leaves the milking stall. By means of this parameter, it is possible to identify which animals in a herd leaving the milking stall substantially immediately and which animals in the herd leaving the milking stall after a certain time period has passed.

According to an embodiment of the invention, the device comprises a detecting member adapted to detect when an animal leaves the milking stall. Such a detecting member may be an already existing positioning sensor in the milking stall configured to detect the position of the animal in the milking stall. By means of information from the detecting member, it is possible for the control unit to measure the real time at which an animal leaves the milking stall. Furthermore, the control unit may stop the activation of the unit when it receives information from the detecting member informing that an animal has left the milking stall.

According to an embodiment of the invention, the control unit is also configured to have the option not to activate any of the units when it is time for an animal to leave the milking stall. The animals in a herd are different. Usually, most animals in a herd leave the milking stall substantially immediately every time when they have been milking. By identifying this group of animals in a herd, it is possible for the control unit to select the option not to activate any of the units when it is time for such an animal to leave the milking stall because these animals do not need to be subjected to the motivation means. The control unit may receive information about the quantity of milk produced during each milking process in the milking stall. If the control unit notes that the quantity of milk decreases for a specific animal when the motivation means has been used, the control unit may have the option not to activate any of the motivation means the following times this animal has to leave the milking stall.

Advantageously, the control unit may be configured not to activate any of the units during periods when the influx of animals to the milking stall is low. The control unit may, for example, not activate any of the units during times of the day and the night when few animals want to be milked. In case the animals have to enter a waiting area before they enter the milking stall, the control unit may be configured to receive information about the numbers of animal in the waiting area. In case the number of animals in the waiting area is lower when a predetermined number, the control unit may not activate any of the units.

According to an embodiment of the invention, the control unit is configured to activate at least one of the units with a predetermined time delay after the earliest time at which the animal has the opportunity to leave the milking stall and if the detection member detects that the animal has left the milking stall within said predetermined time delay, the control unit is configured to prevent the activation of the unit. In most cases, it takes a number of seconds for an animal to leave the milking stall. The predetermined time delay may correspond to the normal time it takes for an animal to leave the milking stall. The animals may here learn to leave the milking stall within the predetermined time delay in order to avoid that a motivation means is activated.

According to a further embodiment of the invention, the milking stall is associated with an exit gate controlled by the control unit. In order to control the cow traffic from the milking stall, it is favorable to use an exit gate. When the control unit opens the exit gate, it is time for the animal to leave the milking stall. The milking stall may comprise a milking robot configured to attach teat cups to the teats of an animal in the milking stall. Since milking stalls with milking robots are expensive, it is necessary that such milking stalls are capable to milk a relatively large herd of milking animals. It is therefore especially preferable to use the device in such milking stalls because it ensures that the animals substantially always leave the milking stall in time resulting in that unnecessary delays between the milking processes in the milking stall are avoided.

According to an embodiment of the invention, the device is arranged in a milking stall on a rotary platform. In this kind of milking stalls, it is also important that the animals leave the milking stall substantially immediately when the milking stall arrives to an exit area. Otherwise the platform becomes stationary for a time and a cow to be milked has to wait until the milking stall becomes vacant.

BRIEF DESCRIPTION OF THE DRAWINGS

In the following, preferred embodiments of the invention are described by examples and with references to the attached drawings, on which.

BRIEF DESCRIPTION OF PREFERRED
EMBODIMENTS OF THE INVENTION

Figure 1:
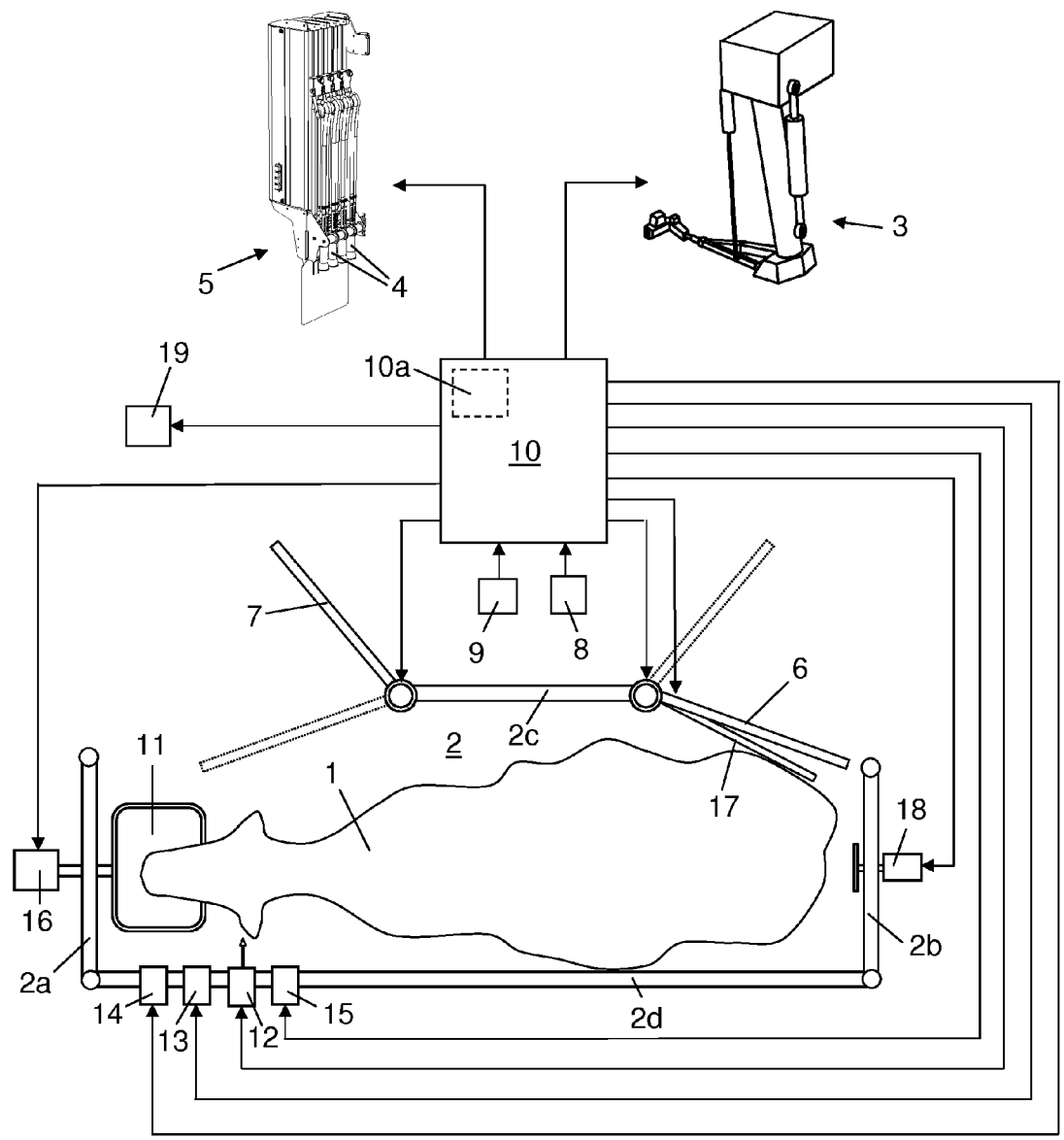
FIG. 1 shows a view, from the above, of a milking stall with a device according to a first embodiment of the invention

FIG. 1 shows a milking stall 2 for voluntary milking of cows 1. The milking stall 2 is defined by wall elements 2a-2d forming a closed space for the cow 1 during the milking process. In this case, the walls comprise a front transverse wall element 2a, a rear transverse wall element 2b, a right longitudinal wall element 2c and a left longitudinal wall element 2d. The wall elements 2a-2d are here named in view of the position of the cow 1 in the milking stall 2. The milking stall 2 comprises a milking robot 3 configured to attach teat cups 4 to the teats of the cow 1 in the milking stall 2. The milking stall 2 comprises a teat cup storing device 5 configured to store the teat cups 4 in a parked position when they are not used. The teat cup storing device 5 comprises a not visible removing cylinder for each teat cup 4 configured to remove the teat cup 4 from a teat when a milking process has been finished. The milking stall 2 comprises further an entrance gate 6 arranged at a rear part of the right longitudinal wall element 2c and an exit gate 7 arranged at a front part of the right longitudinal wall element 2c. The entrance gate 6 and the exit gate 7 are pivotally arranged between a closed position and an open position.

The milking stall 2 comprises a schematically disclosed identifying sensor 8 configured to identify the cows 1 entering the milking stall. The milking stall comprises further a schematically disclosed detecting member 9 configured to detect the position of a cow 1 in the milking stall. The detecting member 9 may be a camera arranged in a position above the cow 1 in the milking stall 2. A control unit 10 is configured to receive information from the identifying sensor 8 and the detecting member 9. The control unit 10 is also in this case configured to control the milking robot 2, the removing cylinders, the entrance gate 6 and the exit gate 7. A feeding trough 11 is arranged in a front portion of milking stall. The feeding trough 11 attracts the cow and facilitate the positioning of a cow 1 in the milking stall.

The milking stall comprises a device to motivate a cow to leave the milking stall 2. The device comprises several kinds of units 12-19. Each unit 12-19 is provided with different types of motivation means configured to motivate a cow 1 to leave the milking stall when a milking process has been finished and the exit gate 7 has been open. A first unit is a blowing unit 12. The blowing unit 12 provides motivation means in the form of air jets towards the head of the cow 1 in the milking stall 2 when it is time for a cow 1 to leave the milking stall 2. A second unit is a water squirting unit 13. The water squirting unit 13 provides motivation means in the form of water jets towards the cow 1 when it is time to leave the milking stall. A third unit is an audio unit 14. The audio unit 14 provides motivation means in the form of a sound alarm in the milking stall 2 when it is time for a cow 1 to leave the milking stall 2. A fourth unit is a light unit 15. The light unit 15 provides motivation means in the form of a flashing light alarm in the milking stall when it is time for a cow 1 to leave the milking stall.

A fifth unit is a food removing unit 16. The food removing unit 16 provides motivation means in the form of a removing motion of the feeding trough 11 in the milking stall 2. One reason for a cow 1 to stay in the milking stall is the availability of food. By removing the feeding trough 11 with the food from the position in front of the cow 1, the motivation of the cow 1 to stay in the milking stall is significantly reduced. The feeding trough 11 is preferable removed well before the exit gate 7 is open. A sixth unit is a mechanic unit able to provide mechanical pushing motions against a rear portion of the cow 1 by means of a swingable member 17. The swingable member 17 is, in this case, mounted in the entrance gate 6. Alternatively, the milking robot 3 may be able to act with pushing motions on the cow 1. A seventh unit is an electric unit 18. The electric unit 18 is configured to supply low-voltage electric impulses to a rear portion of the cow 1. The above mention motivation means are arranged inside the milking stall 2. These motivation means have the task to wake up a cow 1 in the milking stall 2 and pay attention to the fact that it is time to leave the milking stall 2. An eight unit is a sound unit 19 mounted outside the milking stall. The sound unit 19 is able to create a sound from a position outside the milking stall 2, which is perceived positive for the cow 1. The positive sound unit 19 may, for example, be the same sound which generates when food is fed into a feeding trough 11. In this case, the cow is motivated to leave the milking stall 2 since she believes there is access to food outside the milking stall 2. The abovementioned units 12-19 is example of different kinds of units 12-19 which may be used in a device in a milking stall. A device according to the present invention may, for example, comprise three to five different kinds of units 12-19. The control unit comprises a memory 10a configured to store data of individual animals milked in the milking stall 2. The memory 10a is configured to store data about a parameter related to how effectively the different types of motivation means affects on the individual cows when it is time to leave the milking stall 2. The parameter is here related to the time difference between the earliest time when the cow 1 has the opportunity to leave the milking stall after a milking process and the real time at which the cow 1 leaves the milking stall 2.

A cow 1 which wants to be milked walks to the milking stall 2. When the milking stall 2 is vacant, the control unit 10 opens the entrance gate 6 and the cow 1 enters the milking stall 2. The identifying sensor 8 identifies the cow 1 before or after the cow 1 has entered the milking stall 2. The detecting member 9 detects the position of the cow 1 in the milking stall. The control unit 10 closes the entrance gate 6 when it receives information from the detecting member 9 indicating that the whole cow 1 is in the milking stall 2. The control unit 10 activates the milking robot 3. The milking robot 3 attaches the teat cups 4 to the cow 1. The milking process starts and the cow 1 eats food in the feeding trough 11. When the milking process is finished, the control unit 10 activates the removing cylinders which remove the teat cups 4 from the teats. The control unit 10 opens the exit gate 7 when it is time for the cow 1 to leave the milking stall.

At the same time as the exit gate 7 has been open, the control unit 10 selects and activates at least one of the above mentioned units 12-19. The selected unit 12-19 provides one of the above mentioned motivation means, such that the cow 1 in the milking stall 2 will be motivated to leave the milking stall 2. The control unit 10 receives information from the detecting member 9 when the cow 1 has left the milking stall. The control unit 10 stops the activation of the unit 12-19 when it receives this information. The control unit 10 closes the exit gate 7 and open the entrance gate 6. The milking stall 2 is now ready to receive a new cow 1.

The control unit 10 measures and stores information in the memory 10a regarding the identity of the cow 1, used unit 12-19 and the time difference between the time at which the exit gate 7 is open and the real time at which the cow 1 leaves the milking stall 2 for all milking processes. The time at which the exit gate 7 is open is a known parameter for the control unit 10. The control unit 10 receives information about the real time at which the cow 1 leaves the milking stall 2 from the detecting member 9. In view of these stored data in the memory 10a, it is possible for the control unit 10 to select and activate a suitable unit 12-19 each time an individual cow 1 has entered the milking stall 2.

The control unit 10 is also able to select the option not to activate any of the units 12-19 when it is time for a cow 1 to leave the milking stall 2. Most cows 1 in a herd leave the milking stall 2 immediately every time when they have been milking. For these cows 1, it is not necessary to activate any of the units 12-19 when it is time to leave the milking stall 2. The first time a cow 1 enters the milking stall 2, the control unit 10 may select the option not to activate any of the units 12-19. The control unit 10 notes the time difference between the time at which the exit gate 7 is open and the real time at which the cow 1 leaves the milking stall 2. The control unit 10 compares the time difference with an acceptable time difference. If the measured time difference is shorter than the acceptable time difference, the control unit 10 notes that it seems to be possible to select the same option the next time this cow enters the milking stall namely not to activate any of the units 12-19. On the other hand, if the time difference is longer than the acceptable time difference, the control unit 10 notes that it is necessary to test one of the other units 12-19 on this cow 1.

The next time this cow 1 enters the milking stall, the control unit 10 selects and activates one of the other units 12-19. The control unit 10 notes the time difference for the cow 1 in this case. The control unit 10 compares the time difference with the acceptable time difference. If the time difference is shorter than the acceptable time difference, the control unit 10 notes that it seems to be possible to use this unit 12-19 on this cow 1. If the time difference is longer than the acceptable time difference, the control unit 10 notes that it is necessary to select and activate one of the other units 12-19 the next time this cow 1 enters the milking stall 2. The control unit 10 works here in an adaptive way when it selects and activates one of the units 12-19 depending on previous milking processes for individual cows 1. In this case, it is substantially always possible to select and activate a unit 12-19 which has capacity to motivate an individual cow 1 to leave the milking stall 2 within the acceptable time difference.

However, the control unit 10 may select and activate one of the units 12-19 in many different ways. One way is to select one of the units 12-19 by means of a random number generator. In this case, the unit 12-19 will be selected and activated randomly each time a cow 1 has entered the milking stall. In this case, it is not necessary to use said memory 10a. An alternative way, the memory contains stored data of the identity of the cow 1 and used unit 12-19 for all milking processes of the individual cows 1 in the milking stall. In this case, the control unit may select and activate said units 12-19 in one and the same order for all cows 1.

Figure 2:
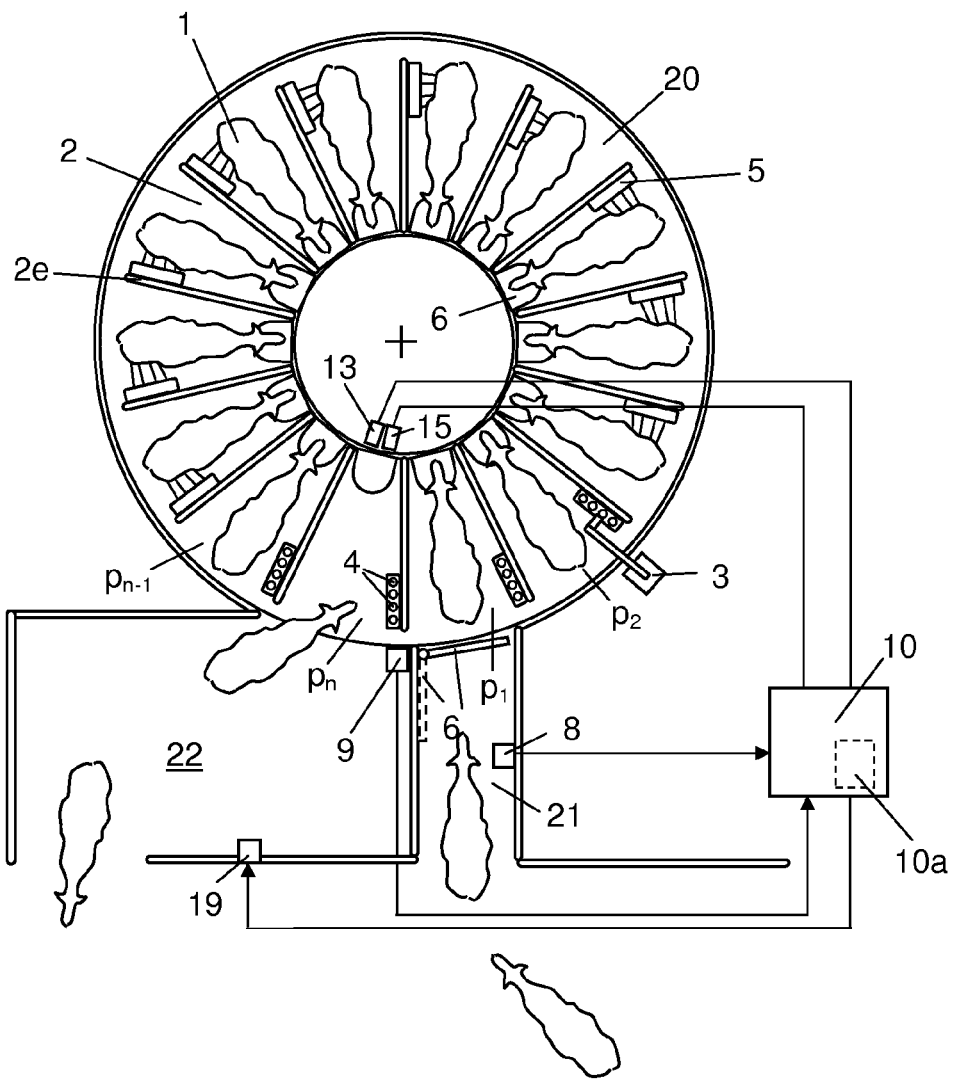
FIG. 2 shows a milking stall on a rotary platform with a device according to a second embodiment of the invention.

FIG. 2 shows a milking arrangement for milking of cows 1 in the form of a rotary annular platform 20. A plurality of fence arrangements 2e are arranged on the upper surface of the platform 20. The fence arrangements 2e form milking stalls 2 configured to receive individual cows 1 in predetermined milking positions. In this case, the fence arrangements 2e have an essentially straight radial extension on the platform 20. The fence arrangements 2e are arranged at equal intervals around the annular platform 20.

Each milking stall 2 is provided with a feeding trough 11 arranged in the vicinity of the inner periphery edge of the platform. Each milking stall 2 is also provided with four separate teat cups 4.

Each milking stall comprises a storing device 5 adapted to hold the teat cups 4 in a parked position when they are not in use. A milking robot 3 is arranged at an outer periphery edge of the platform 20. The milking arrangement comprises an entrance passage 21 to the platform 20. The entrance passage 21 is provided with an identification sensor 8 and a movable gate 6. A detecting member 9 is arranged at an exit opening. The object of the detecting member 9 is to detect when a cow 1 leaves a milking stall 2 and thus the platform 20. An exit area 22 is arranged in connection to the platform 2 at the exit opening. The exit area 22 is entered by a cow 1 when it leaves the platform 20.

A cow 1 wanted to be milked walks to the entrance passage 21 leading to the rotary platform 20. The identification sensor 8 identifies the cow 1. The gate 6 is in a closed position when the cow 1 arrives to the front position of the entrance passage 21. When a milking stall 2 arrives to a first rotational position $p_1$, just in front of the gate 6, the control unit 10 opens the gate 6 and the cow 1 enters the milking stall 2 on the platform 20. The gate 6 is moved back to the closed position as soon as the whole cow 1 has entered the milking stall 2. The feeding trough 11 attracts the cow 1 and facilitates the positioning of the cow 1 in the milking stall 2. The cow 1 stands here in a radial direction on the platform 20 with the head at an inner periphery edge of the platform 20.

When the milking stall 3 with the cow 1 has rotated to a second rotational position $p_2$, the milking robot 3 is activated and it fetches the teat cups 4 from the storing device 5 and attaches them to the cow 1. The platform 20 is driven with a slow speed such that it is no problem for the milking robot 3 to attach the teat cups 4 to the cow 1. The milking process of the cow 1 starts when all teat cups 4 have been attached to the cow 1. The milking process proceeds during nearly one revolution of the milking stall 2 on the platform 20. As soon as the milk flow drops below a predetermined value, a removing device removes the teat cups 4 from the teats of the cow 1. If the teat cups 4 have not been removed earlier, they are at least removed when the milking stall 2 reaches a penultimate rotational position $p_{n-1}$. Finally, when the milking stall 2 reaches a last rotational position $p_n$, the cow 1 has to leave the milking stall 2 and enter the exit area 22. Thereafter, the milking stall 2 again will be rotated to the first rotational position $p_1$ and be ready to receive a new cow 1.

It is important that a cow 1 leaves the milking stall 2 substantially immediately when the milking stall 2 reaches the last rotational position $p_n$. The milking arrangement comprises a device in the form of three units 13, 15, 19 namely a water squirting unit 13 providing motivation means in the form of water jets towards the cow 1 in the milking stall 2, a light unit 15 providing motivation means in the form of a flashing light alarm in the milking stall 2 and a sound unit 19 providing a positive motivation means. The water squirting unit 13 and the light unit 15 is mounted at the inner peripheral edge of the platform 20 in the vicinity of the head of the cow 1 when the milking stall 2 is in the last rotational position $p_n$. The sound unit 19 is mounted in the exit area 22 at a distance from the milking stall 2.

The control unit 10 is configured to receive information from the identifying sensor 8 and the detecting member 9. By means of this information, it is possible for the control unit 10 to store information in a memory 10a of the time difference between the time at which the cows 1 have opportunity to leave the milking stall 2 and the real time at which the cows 1 leave the milking stall 2. This information is stored together with the used unit 13, 15, 19. The control unit 10 may select one of the units 13, 15, 19 for the individual cows 1 in the same adaptive way as described above.

In this case, the control unit 10 activates a selected unit 13, 15, 19 with a predetermined time delay of some seconds after the milking stall 2 has reached last rotational position $p_n$. If a cow 1 leaves the milking stall within the predetermined time delay, the control unit 10 is here configured to prevent the activation of the selected unit 13, 15, 19. Thus, if a cow 1 leaves the milking stall 2 within this predetermined time delay, the motivation means will not be activated. The cow 1 has here the possibility to avoid activation of the motivation means by leaving the milking stall substantially immediately when the milking stall 2 reaches last rotational position $p_n$. The control unit 10 is also in this case able to vary the activation of motivation means of the units 13, 15, 19 in time and in intensity. Thereby, it is possible to expose the cows 1 for motivation means of an increased intensity if a normal intensity does not work.

By means of the device described above, it is possible to motivate substantially all cows 1 in a herd to leave the milking stall on the platform 20 substantially immediately when the milking stall 2 reaches the last rotational position $p_n$. It is possible to provide milking operations in the milking stalls 2 on the platform 20 substantially without delays caused by cows 1 which do not leave the platform 20 in time.

The invention is not limited to the described embodiments but may be varied and modified freely within the scope of the claims.

The invention claimed is:

1. A device to motivate an animal (1) to leave a milking stall (2) after each of plural milkings, comprising:
   plural motivation units (12-19) that each produce a motivation means that motivates the animal to leave a milking stall,
   wherein a first of said motivation units (12-19) is located within the milking stall and produces a first motivation means, a second of said motivation units (12-19) is located within the milking stall and produces a second motivation means, and the first motivation means is different from the second motivation means; and
   a control unit (10) that i) determines a time for the animal (1) to leave the milking stall (2) after each of the plural milkings, and ii) is operatively connected to each of said motivation units (12-19) to selectively activate each of said motivation units (12-19) to produce a selected one of the motivation means, wherein,
   said control unit is provided with software that makes and executes a selection, from plural alternative selections, concerning which of said motivation units (12-19) to activate at the determined time for the animal (1) to leave the milking stall (2) after a current one of the plural milkings, said selection being based to provide different types of motivation means for each of the plural milkings,
   a first of said selections is to activate said first motivation unit to produce the first motivation means such that the animal (1) in the milking stall (2) will be motivated to leave the milking stall, and
   a second of said selections is to activate said second motivation unit to produce the second motivation means such that the animal (1) in the milking stall (2) will be motivated to leave the milking stall.

2. The device according to claim 1, wherein,
   the control unit includes a random number generator that generates a random result, and an activation schedule for activating the first and second motivation units,
   the control unit (10) is configured to receive the random result generated by the random number generator, and to receive schedule information from the activation schedule,
   the control unit's selective activation is based on one of the group consisting of
   i) randomly selecting the selection, from the plural alternative selections, based on the random result received from the random number generator, and
   ii) non-randomly selecting the selection, from the plural alternative selections based on the received schedule information from the activation schedule.

3. The device according to claim 1, wherein,
   the control unit includes a random number generator,
   the control unit (10) is configured to receive a result of the random number generator, and
   the control unit's selective activation is based on randomly selecting the selection based on the received result from the random number generator.

4. The device according to claim 1, wherein,
   the control unit includes an activation schedule with schedule information for activating the first and second motivation units according to a predetermined order,
   the control unit (10) is configured to receive the schedule information from the activation schedule,
   the control unit's selective activation is a non-random selection, from the plural alternative selections, based on the received schedule information from the activation schedule, regardless of whether the animal (1) or another animal (1) is in the milking stall (2).

5. The device according to claim 1, further comprising:
   an identifying sensor (8) that identifies an identity of a currently-present individual animal (1) in the milking stall; and
   a memory (10a) that stores data of the individual animals (1) milked in the milking stall (2),
   wherein the control unit (10) is configured to receive i) the data of the individual animals (1) milked in the milking stall (2) and ii) the identity of the currently-present individual animal (1) in the milking stall, the received data and identity being used by the control unit (10) in making the selection, from the plural alternative selections, concerning which of said motivation units (12-19) to activate.

6. The device according to claim 5, wherein,
   said memory is comprised of said data which is comprised of a parameter related to how effectively each of the motivation means affects the individual animals (1) in motivating each respective animal to leave the milking stall, and
   the control unit (10) is configured to make the selection concerning which of said motivation units (12-19) to activate by using said data about the parameter related to how effectively each of the motivation means is in motivating the currently-present individual animal to leave the milking stall.

7. The device according to claim 6, further comprising:
   a detection member (9) that detects when each animal leaves the milking stall (2), wherein,
   said parameter is related to a time difference between an earliest time when the currently-present individual animal (1) has an opportunity to leave the milking stall and a real time at which the currently-present individual animal (1) leaves the milking stall (2) as detected by the detection member (9), and
   the control unit's selective activation adaptively alternatives the selection concerning which of said motivation units (12-19) to activate based on said parameter is related to a time difference between an earliest time when the currently-present individual animal (1) has an opportunity to leave the milking stall and a real time at which the currently-present individual animal (1) leaves the milking stall (2).

8. The device according to claim 1, wherein the software provided in said control unit is configured to execute a third selection, the third selection being to activate none of said motivation units to allow the animal (1) in the milking stall (2) to leave the milking stall without any of said motivation means being produced.

9. The device according to claim 8, wherein the control unit (10) is configured to receive information concerning a number of animals in a waiting area to determine whether an influx of animals to the milking stall is low, and the control unit's selective activation provides for selection of the third of said selections during time periods when the influx of animals to the milking stall is determined to be low.

10. The device according to claim 1, further comprising:
a detection member (9) that detects when each animal leaves the milking stall (2), wherein,
the control unit (10) waits a predetermined time delay, after an earliest time when the animal (1) has an opportunity to leave the milking stall (2) after a milking process, before executing the selection concerning which of said motivation units (12-19) to activate, and
when the detection member (9) detects that the animal (1) has left the milking stall within said predetermined time delay, the control unit (10) cancels executing the selection concerning which of said motivation units (12-19) to activate.

11. The device according to claim 1, wherein at least one of the first and second motivation means include an alarm.

12. The device according to claim 1, wherein the first and second motivation means include at least two selected from the group consisting of a gas jet directed to the animal, a liquid jet directed to the animal, a sound alarm, a light alarm, a mechanical component acting on the animal, electric impulses, and removing food in the milking stall.

13. The device according to claim 1, wherein,
the plural motivation units (12-19) include a least three different motivation units (12-19) located within the milking stall, and
the motivation means of each motivation unit is different from the motivation means of the other motivation units.

14. The device according to claim 1, wherein at least one of said motivation units (12-19) is configured to produce a varying motivation means that varies in at least one of time and intensity.

15. The device according to claim 1, wherein the milking stall (2) comprises an exit gate (7) controlled by the control unit (10).

16. The device according to claim 1, wherein the milking stall (2) comprises a milking robot (2) configured to attach teat cups (3) to the teats of the animal (1) in the milking stall (2).

17. The device according to claim 1, wherein the milking stall (2) is arranged on a rotary platform (20).

18. The device according to claim 1, further comprising a further motivation unit positioned outside the milking stall that produces a further motivation means, the further motivation means comprising at least one of an attractive sound, an attractive sight, and an attractive smell.

19. The device according to claim 1, wherein at least one of the first and second motivation units includes a mechanical component that, when activated, acts on the animal.

20. The device according to claim 1, wherein at least one of the first and second motivation units is configured to produce at least one motivation means selected from the group consisting of a gas jet directed to the animal, a liquid jet directed to the animal, electric impulses, and removing food in the milking stall.

* * * * *